V. DEISENHOFER.
SPRING TIRE.
APPLICATION FILED DEC. 17, 1917.
1,290,113.
Patented Jan. 7, 1919.
2 SHEETS—SHEET 1.
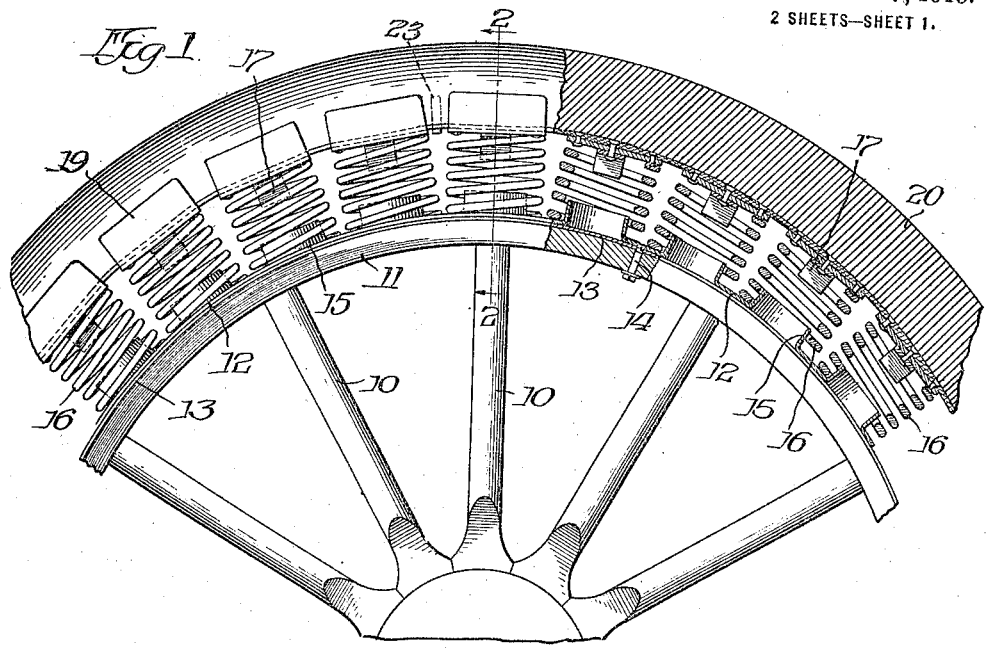
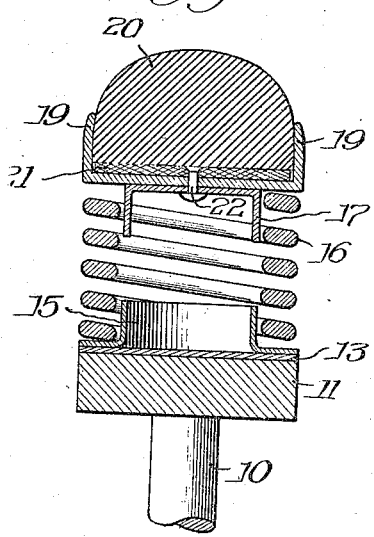
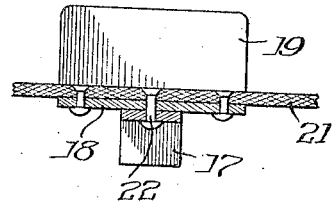
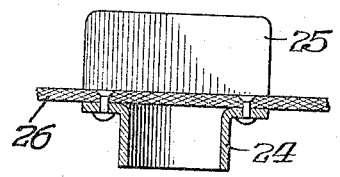

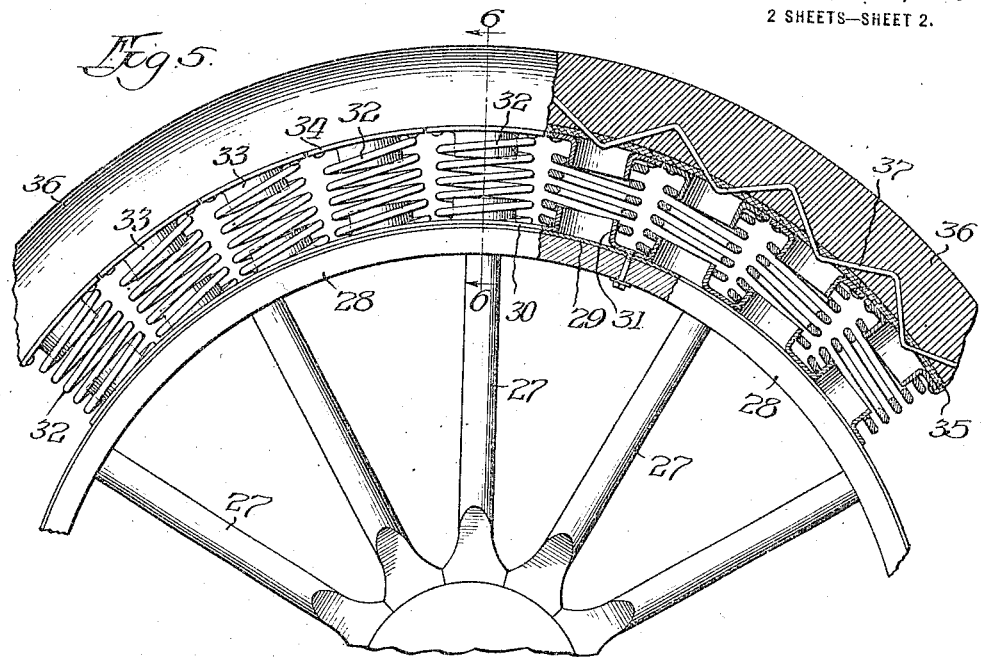
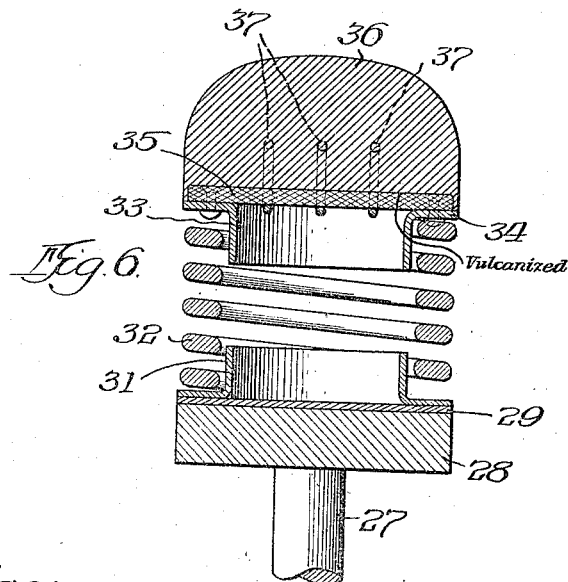

UNITED STATES PATENT OFFICE.

VICTOR DEISENHOFER, OF CHICAGO, ILLINOIS.

SPRING-TIRE.

1,290,113.      Specification of Letters Patent.      Patented Jan. 7, 1919.

Application filed December 17, 1917. Serial No. 207,401.

*To all whom it may concern:*

Be it known that I, VICTOR DEISENHOFER, a subject of the Emperor of Austria-Hungary, and a resident of Chicago, in the county of Cook and State of Illinois, have invented certain new and useful Improvements in Spring-Tires, of which the following is a specification.

My invention relates to wheels for vehicles and particularly to a novel resilient tire.

An object in the invention is to provide a construction in which there is greater flexibility in the tire and therefore greater resiliency in its use. One of the advantages in the use of a spring tire such as disclosed by me is that of the reduction of weight and the elimination of metallic parts at points adjacent to or in contact with the rubber tread. Due to the requirements for constant flexure or resiliency, any metallic portions will develop considerable heat and this tends to vulcanize the rubber and cause deterioration thereof. In my construction there are no metallic portions in direct contact with the rubber tread. The springs are centered by means of metallic members which are permanently secured to a fabric band underlying the tread.

In my construction I provide a flexible tread and mount the same on a flexible annular member which bears on the springs through the medium of suitable attaching clips. By reason of this construction the tread may be flexed or distorted at separated points, as when engaging an obstruction, without imparting any motion to the remainder of the tire.

The construction will be more readily understood by reference to the accompanying drawings, in which:

Figure 1 is a fragmentary side elevation of a wheel, equipped in accordance with my invention, a portion thereof being shown in section:

Fig. 2 is a sectional view on the line 2—2 of Fig. 1;

Fig. 3 is a fragmentary sectional view showing the means of connection between the springs and tread at the outer ends of the springs;

Fig. 4 is a slight modification of the construction shown in Fig. 3;

Fig. 5 is a view similar to Fig. 1, showing a slight modification, and,

Fig. 6 is a sectional view on the line 6—6 of Fig. 5.

In the drawings, the wheel (Fig. 1) is indicated at 10, and its felly at 11. The spring tire is intended to be manufactured and assembled as a unit and to be applied to the wheel by fitting the same over the felly. The inner periphery of the tire unit is constituted by an annular band 12, which fits snugly on the felly-band 13, and is held by suitable radial bolts 14. The band 12, is provided with spaced thimbles or hollow lugs 15, which may be struck up from the band and serve as centering devices for the springs 16. The springs at their outer ends are held against lateral movement by engagement with U-shaped clips 17, which (as best shown in Figs. 2 and 3) are riveted to right angularly and oppositely disposed U-shaped members 18, the sides 19, of which engage the sides of the tread 20, and prevent the same from lateral movement.

An endless annular band 21, of heavy, tough fabric, such as belting, is located at the base of the tread and is secured to the clips 17, 18, by means of the rivets 22. Suitable means such as pins or bolts, indicated at 23, in Fig. 1, may be employed for preventing rotation of the tread on its supporting flexible band.

It will be noted that each spring may be operated substantially independently of the others. Furthermore, that the tire described may be manufactured as a unit and applied to any felly of the required dimensions, no change being necessary in the wheel or felly-band as now commonly manufactured.

In the construction shown in Fig. 4, the upper holding clip is slightly modified by the elimination of one part. In this construction the spring-centering sleeve 24, is struck out from the U-shaped member 25, and the fabric band 26, is directly riveted thereto, as shown.

The construction shown in Figs. 5 and 6 is intended particularly for use on the driving wheels of vehicles and is not materially different from that heretofore described. The wheel 27, felly 28, and felly-band 29, are the same as shown in Fig. 1. Likewise the inner annular band 30, having the spring-centering sleeves 31, is the same. The springs 32, at their outer ends are held by means of separate centering devices consisting of the thimbles 33, having the flanges 34, which are riveted to the fabric band 35. This band is secured permanently to the tread 36, by interlacing the wires 37, therewith and by molding the wires in the tread. This results in vulcanizing the band to the tread and provides a more sightly construction as the metallic tread-holding clips shown in Fig. 1, are eliminated. However, in this construction as in that heretofore described, the springs are adapted to act independently and the tread may be flexed at separated points without requiring movement of the entire tread and the compression of a plurality of springs in order to take up a shock which is concentrated at one point.

The outer annular bands 21 and 35, are preferably composed of heavy woven fabric so treated as to be unaffected by water. The band may, however, be formed of leather or similar material. The reference in the claims to a band composed of fibrous material is considered as covering these and similar forms of material. One of the advantages in the use of a non-metallic member is the absence of heat at that point. This is an objectionable feature where a metallic band is employed, the incessant flexure while in service developing considerable heat and finally resulting in crystallization.

Undoubtedly other modifications will suggest themselves to those skilled in the art and I do not wish to be limited except as indicated in the appended claims.

I claim:

1. In a spring tire, the combination of a continuous, inner metallic band adapted to fit over and be secured to the felly band of a wheel, integral bosses on said inner band, a single, continuous outer fibrous band having spring holding devices thereon, a rubber tread firmly secured to said outer band, and springs for spacing apart said bands, substantially as described.

2. In a spring tire, the combination of a continuous, inner metallic band adapted to fit over and be secured to the felly band of a wheel, said band being formed with spaced integral hollow bosses, an outer fibrous band having spring centering devices thereon, a rubber tread secured to said outer band, and springs held between said bands, substantially as described.

3. In a spring tire, the combination of a continuous inner metallic band having integral, spring-centering bosses thereon, a continuous outer fibrous band having spring-centering devices riveted thereto, a rubber tread vulcanized to said outer band, and springs for spacing apart said inner and outer bands, said tire being adapted to be readily removed from the wheel as a unit, substantially is described.

4. In a spring tire, the combination of a continuous inner metallic band having integral, spring-centering bosses thereon, a single continuous outer fibrous band having spring-centering devices riveted thereto, a rubber tread vulcanized and mechanically united to said outer band, and springs for spacing apart said inner and outer bands, said tire being adapted to be readily removed from the wheel as a unit, substantially as described.

Signed at Chicago, Ill., this 14th day of December, 1917.

VICTOR DEISENHOFER.

Witness:
T. D. BUTLER.